April 9, 1940. A. A. GONZÁLEZ 2,196,915
ILLUMINABLE ATTACHMENT FOR AUTOMOTIVE VEHICLES
Filed May 23, 1938
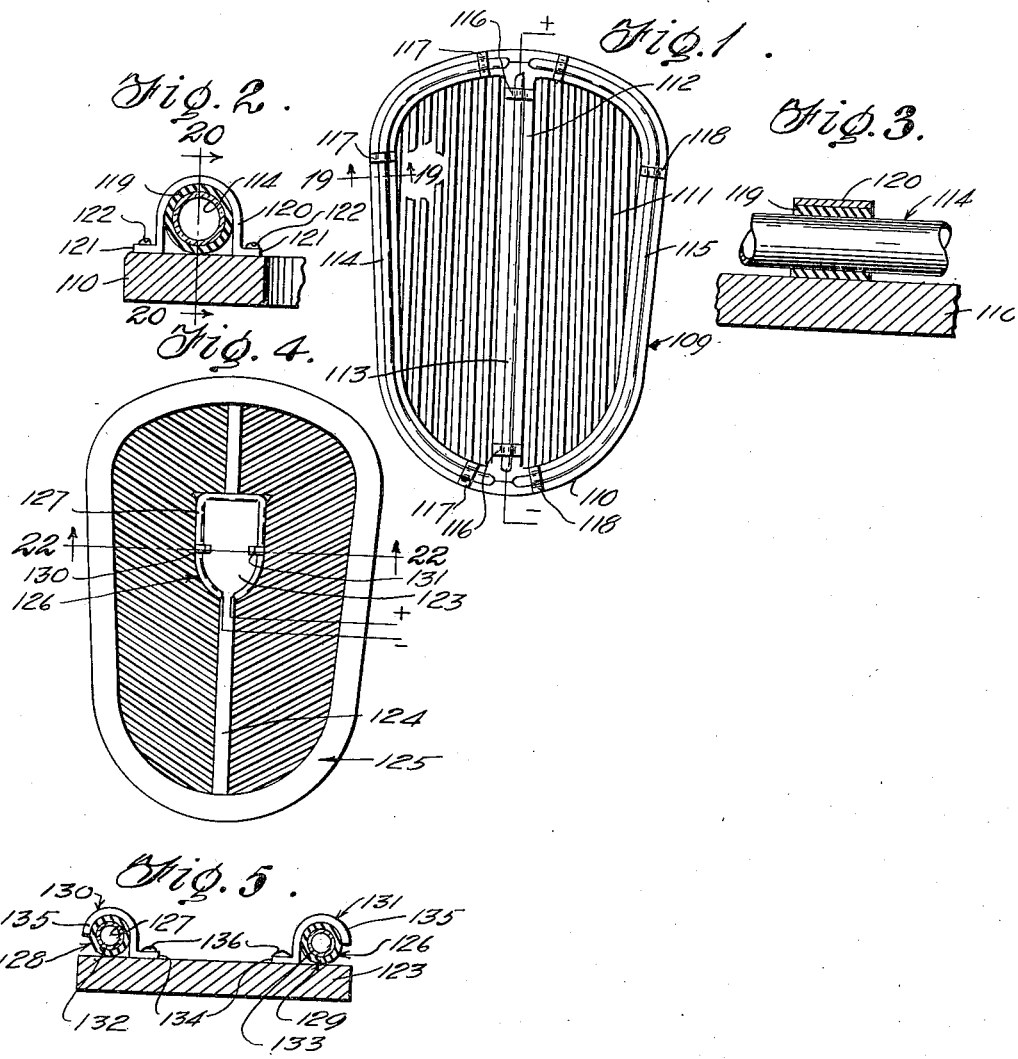
Inventor
A. ANDRADE GONZALEZ,
By Kimmel & Crowell
Attorneys Patented Apr. 9, 1940

2,196,915

UNITED STATES PATENT OFFICE 2,196,915

ILLUMINABLE ATTACHMENT FOR AUTOMOTIVE VEHICLES

Alberto Andrade González, Mexico, D. F., Mexico

Application May 23, 1938, Serial No. 209,628
In Mexico June 14, 1937

5 Claims. (Cl. 240—8.11)

This invention relates to an attachment for automotive vehicles and has for its object to provide, in a manner as hereinafter set forth, means, independent of the headlights of the vehicle for illuminating the grille which is positioned in advance of the radiator and disposed centrally of the front end of the vehicle whereby the possibilities of accidents and collisions are reduced to a minimum when operating automotive vehicles at night.

The invention has for its further object to provide, in a manner as hereinafter set forth, means for illuminating the front end of automotive vehicles, such as automobiles, buses, locomotives, street cars, trucks, etc., with such illumination being independent of the headlight or headlights of the vehicles and acting as a safeguard to the operator of an oncoming vehicle or to a pedestrian whereby the possibilities of collisions and accidents are materially reduced.

The invention has for its further object to provide, in a manner as hereinafter set forth, means for illuminating the front of an automotive vehicle to constitute a safeguard to the operator of an oncoming vehicle from the glaring effect of the headlights of an approaching vehicle, or when the headlights of the latter are shut off or dimmed whereby a warning is given to such operator to control his vehicle in a manner to prevent a collision with the approaching vehicle.

The invention has for its further object to provide, in a manner as hereinafter set forth, means independent of the headlights of an automotive vehicle for illuminating the front end or a part of said end of the vehicle for the purpose aforesaid.

The invention has for its further object to provide, in a manner as hereinafter set forth, means independent of the headlights of an automotive vehicle for completely or partly illuminating the grille which is positioned in advance of the radiator and disposed centrally of the front end of the vehicle to act as a safeguard for the driver of an oncoming vehicle and constitute a warning for the driver to control his vehicle in a manner to prevent a collision.

Further objects of the invention are to provide, in a manner as hereinafter set forth, an attachment for the purpose referred to which is comparatively simple in its construction and arrangement, strong, durable, compact, thoroughly efficient in its use, readily installed with respect to the vehicle, and comparatively inexpensive to set up.

Embodying the objects aforesaid, and others which may hereinafter appear, the invention consists of the novel construction, combination and arrangement of parts as will be more specifically referred to and illustrated in the accompanying drawing, wherein embodiments of the invention are shown, but it is to be understood that changes, variations and modifications may be resorted to which fall within the scope of the invention as claimed.

In the drawing:

Figure 1 is a front elevation of an automobile grille showing a form of the invention wherein neon tubing is supported in front of the grille frame and ribbing of the latter, Figure 2 is an enlarged section on the line 19—19 of Figure 1, Figure 3 is a section on the line 20—20 of Figure 2, Figure 4 is a view showing in front elevation an automobile grille showing installed therewith a modified form of the invention consisting of a shield or other ornament illuminated by neon tubing, Figure 5 is an enlarged detailed section on the line 22—22 of Figure 4.

The form of attachment shown by Figures 1, 2 and 3 is of a type which is secured against the outer face of a grille 109 formed of a frame 110, spaced bars 111 and a central rib 112. The attachment includes a central neon tube 113, a pair of oppositely disposed outer neon tubes 114, 115, a pair of spaced aligned cushioning collars and a pair of spaced aligned attaching members 116 for the tube 113, a set of spaced cushioning collars and a set of spaced attaching members 117 for the tube 114, a set of spaced cushioning collars and a set of spaced attaching members 118 for the tube 115. Each of the cushioning collars 119 will be arranged relatively to a tube in the manner as shown in Figures 2, 3. Each attaching member will be of the form as shown in Figure 2 and it will consist of a semi-oval shaped body part 120 formed with oppositely extending apertured lateral flanges 121 for the passage of holdfast means 122 to secure the member against the outer face of the grille 109. Each of the cushioning collars 119 is arranged relatively to a tube, the grille and an attaching member in the manner as shown in Figures 2, 3.

The tube 113 is of less length than and is positioned against the outer face of the rib 112 on the lengthwise center of the latter. The attaching members 116 are arranged in proximity to the ends of the tube 113. The tubes 114, 115 are of a length to extend throughout the sides and upon the top and bottom of the grille frame 110. Two of the sets of attaching members 117 are arranged in proximity to ends of the tube 114 and the other attaching member 117 of the set is positioned at the top of one side of the grille frame 110. Two of the sets of attaching members 118 are arranged in proximity to the ends of the tube 115 and other attaching member 118 of such set is positioned at the top of the other side of the grille frame 110.

With reference to Figures 4 and 5 the modified form of attachment is to be arranged to surround the marginal portions of the outer face of an ornament or plate 123 which is attached to the front of the central rib 124 of the grille 125. The attachment, indicated at 126, includes an illuminable element in the form of a neon tube 127 of a contour corresponding to the outline of the ornament, a pair of cushioning collars 128, 129 and a pair of oppositely disposed retainers 130, 131 for the tube 127. The latter as shown includes a pair of side portions 132, 133 which are encompassed intermediate their ends by the collars 128, 129 respectively. The retainers are of like form and each of which includes a flat apertured shank 134 merging at its outer end into the rear end of a forwardly directed curved arm 135 for partly encompassing a cushioning collar in a manner as shown in Figure 5. The shanks 134 of the retainers are positioned against the outer face of and secured to the ornament 123 by the holdfast 136. The tube 127 is employed for illuminating the front of the grille 125.

What I claim is:

1. In a self propelled vehicle of that type having a headlight, in combination a grille at the front of the vehicle including an upstanding frame and a rib disposed within, centrally of and merging at its ends into the top and bottom of the frame, a portion of the operating mechanism of the vehicle disposed in juxtaposition to and behind the grille, a central and a pair of outer illuminating elements arranged in spaced relation and acting for rendering the grille visible in the dark independent of the headlight of the vehicle, said central element being disposed substantially throughout the outer face of said rib, one of said outer elements respectively disposed throughout the front face of one side of the frame and on a portion of the front faces of the top and bottom of the frame, and the other of the outer elements respectively disposed throughout the front face of the other side of the frame and on another portion of the front faces of the top and bottom of the frame, said central element having its ends spaced from the ends of the said outer elements.

2. In a self propelled vehicle of that type having a headlight, in combination a grille at the front of the vehicle including an upstanding frame and a rib disposed within, centrally of and merging at its ends into the top and bottom of the frame, a portion of the operating mechanism of the vehicle disposed in juxtaposition to and behind the grille, a central and a pair of outer illuminating elements arranged in spaced relation and acting for rendering the grille visible in the dark independent of the headlight of the vehicle, said central element being disposed substantially throughout the outer face of said rib, one of said outer elements respectively disposed throughout the front face of one side of the frame and a portion of the front faces of the top and bottom of the frame, and the other of the outer elements respectively disposed throughout the front face of the other side of the frame and on another portion of the front faces of the top and bottom of the frame, said central element having its ends spaced from the ends of the said outer elements, superposed spaced means for anchoring the central element to said rib, and spaced means for anchoring each outer element to a side and the top and bottom of the frame.

3. In a self propelled vehicle of that type having a headlight, in combination a grille at the front of the vehicle including an upstanding frame and a rib disposed within, centrally of and merging at its ends into the top and bottom of the frame, a portion of the operating mechanism of the vehicle disposed in juxtaposition to and behind the grille, a central and a pair of outer illuminating elements arranged in spaced relation and acting for rendering the grille visible in the dark independent of the headlight of the vehicle, said central element being disposed substantially throughout the outer face of said rib, one of said outer elements respectively disposed throughout the front face of one side of the frame and a portion of the front faces of the top and bottom of the frame, and the other of the outer elements respectively disposed throughout the front face of the other side of the frame and on another portion of the front faces of the top and bottom of the frame, said central element having its ends spaced from the ends of the said outer elements, superposed spaced means for anchoring the central element to said rib, and spaced means for anchoring each outer element to a side and the top and bottom of the frame, each of said means having as a part thereof, an inner annular resilient cushioning member for and encompassing an illuminating element.

4. In a self propelled vehicle of that type having a headlight, in combination a grille at the front of the vehicle including an upstanding frame and a rib disposed within, centrally of and merging at its ends into the top and bottom of the frame, a portion of the operating mechanism of the vehicle disposed in juxtaposition to and behind the grille, a central and a pair of outer illuminating elements arranged in spaced relation and acting for rendering the grille visible in the dark independent of the headlight of the vehicle, said central element being disposed substantially throughout the outer face of said rib, one of said outer elements disposed throughout the front face of one side of the frame and substantially half of the front faces of the top and bottom of the frame, and the other of the outer elements disposed throughout the front face of the other side of the frame and substantially the other half of the front faces of the top and bottom of the frame, spaced means for anchoring the central element to said rib, and spaced means for anchoring each outer element to a side and the top and bottom of the frame, each of said means having as a part thereof, an inner annular resilient cushioning member for and encompassing an illuminating element, the spaced means for anchoring the central element to the rib being arranged in proximity to the ends of the latter, and the spaced means for anchoring an outer element to the top, bottom and a side of the frame being arranged in proximity to the ends of the outer element and on said side in proximity to the upper end of the latter.

5. In a self propelled vehicle of that type having a headlight, in combination a grille at the front of the vehicle including an upstanding frame and a rib disposed within, centrally of and merging at its ends into the top and bottom of the frame, a portion of the operating mechanism of the vehicle disposed in juxtaposition to and behind the grille, a central and a pair of outer illuminating elements arranged in spaced relation and acting for rendering the grille visible in the dark independent of the headlight of the vehicle, said central element being disposed substantially throughout the outer face of said rib, one of said outer elements disposed throughout the front face of one side of the frame and substantially half of the front faces of the top and bottom of the frame, and the other of the outer elements disposed throughout the front face of the other side of the frame and substantially the other half of the front faces of the top and bottom of the frame, a pair of spaced resilient collars positioned against the outer face of said rib, said central element extending through said collars, a set of spaced resilient collars arranged on the outer faces of the top, bottom and one side of said frame, one of said outer elements extending through the collars of said set, a second set of spaced resilient collars positioned against the outer faces of the top, bottom and other side of said frame, the other outer element extending through the collars of the second set, and means for attaching said collars to the rib and frame.

ALBERTO ANDRADE GONZÁLEZ.